United States Patent
Elkin

(10) Patent No.: US 8,958,543 B1
(45) Date of Patent: Feb. 17, 2015

(54) USE OF INBOUND CALL AS MECHANISM TO TRIGGER OUTBOUND CALLS TO AVOID COLLISIONS

(75) Inventor: Mikhail Genrikhovich Elkin, Norcross, GA (US)

(73) Assignee: Cellco Partnership, Basking Ridge, NJ (US)

( * ) Notice: Subject to any disclaimer, the term of this patent is extended or adjusted under 35 U.S.C. 154(b) by 272 days.

(21) Appl. No.: 13/172,410

(22) Filed: Jun. 29, 2011

(51) Int. Cl.
*H04M 3/00* (2006.01)

(52) U.S. Cl.
USPC .................................................. 379/266.07

(58) Field of Classification Search
USPC .................................................. 379/266.07
See application file for complete search history.

(56) References Cited

U.S. PATENT DOCUMENTS

| | | | |
|---|---|---|---|
| 7,062,020 B1* | 6/2006 | Pirasteh et al. | 379/88.18 |
| 7,369,544 B2* | 5/2008 | Li et al. | 370/353 |
| 2006/0104307 A1* | 5/2006 | Jones et al. | 370/468 |

* cited by examiner

*Primary Examiner* — Nafiz E Hoque

(57) ABSTRACT

A system and machine-implemented method for automated communication relating to configuring a communication channel, selectively configurable between receiving a new inbound communication session and initiating a new outbound communication session, for receiving a new inbound communication session, processing an inbound communication session, determining the inbound communication session has terminated, determining that an outbound communication is pending in response to termination of the inbound communication session, and reconfiguring the communication channel for outbound communication and establishing an outbound communication session in response to the determination that an outbound communication is pending.

20 Claims, 3 Drawing Sheets

USE OF INBOUND CALL AS MECHANISM TO TRIGGER OUTBOUND CALLS TO AVOID COLLISIONS

BACKGROUND

Voice portals are frequently used to answer calls and obtain information from callers. For example, businesses often use voice portals that include interactive voice response (IVR) units to interact with callers and to obtain information from the callers. The IVR systems also are used by businesses to make outgoing calls to customers and/or potential customers. For large businesses, inbound and outbound call traffic can be quite high, and IVR systems for such high traffic volumes operate to handle calls through a large number of ports or line connections.

Conventional IVR systems handle both inbound and outbound communications via a limited number of virtual ports. However, where virtual ports may selectively be used for either inbound or outbound communications, and are switched between these two modes of communication, there is a risk of a call collision, commonly referred to as a "glare" condition. A call collision may a result due to contention that occurs when a terminal seeks to initiate an outbound call on a virtual port and a data circuit-terminating equipment (DCE) seeks to use the same virtual port to handle an incoming call. One possible effect is that when a call collision occurs, the DCE proceeds with the incoming call request and cancels the outbound call.

There are three conventional approaches to "multi-line hunting," in which incoming calls are assigned to ports: (1) circular hunting, which distributes incoming calls to ports in a "round robin" manner (e.g., if three ports are available, incoming calls would be assigned in the order of 1, 2, 3, 1, 2, 3, . . . , with skipping of busy ports); (2) low to high hunting, which distributes an incoming call to the lowest-numbered available port; and (3) most idle hunting, which distributes an incoming call to the port that has been idle the longest. A conventional approach for IVR systems including virtual ports capable of switching between inbound and outbound communications is a variation on the above low to high hunting, in which incoming calls are assigned to the lowest-numbered available port and outbound calls are placed on the highest-numbered available port, which generally avoids glare as the last choice for incoming calls is first choice for outgoing calls. In some cases, the lowest-numbered port s will be dedicated exclusively for handling inbound communications.

However this approach has a disadvantage in that if there is a problem with a low-numbered port, it will affect customer attempts at making inbound calls. Another disadvantage is seen when trouble shooting problems. Since low port numbers may never be used for outbound communications, this may mask issues with initiating outbound communications from low-numbered ports. Likewise, issues with receiving inbound communications on high-numbered ports may also be masked and difficult to investigate. A further disadvantage is that the ports are not loaded evenly (e.g., the lowest-numbered ports often receive the greatest load). Also, as an IVR system ideally fully utilizes its ports by not leaving ports available for a significant period of time, and the inbound/outbound workload changes over time, call collision still remains an issue for ports lying in the middle of the range that are being switched between inbound and outbound communication.

SUMMARY

The disclosed subject matter relates to a machine-implemented method for automated communication including configuring a communication channel, selectively configurable between receiving a new inbound communication session and initiating a new outbound communication session, for receiving a new inbound communication session, processing an inbound communication session, determining the inbound communication session has terminated, determining that an outbound communication is pending in response to termination of the inbound communication session, and reconfiguring the communication channel for outbound communication and establishing an outbound communication session in response to the determination that an outbound communication is pending.

The disclosed subject matter further relates to a system for automated communication, the system comprising: one or more processors; and a machine-readable medium comprising instructions stored therein, which when executed by the processors, cause the processors to perform operations including configuring a communication channel, selectively configurable between receiving a new inbound communication session and initiating a new outbound communication session, for receiving a new inbound communication session, processing an inbound communication session, determining the inbound communication session has terminated, determining that an outbound communication is pending in response to termination of the inbound communication session, and reconfiguring the communication channel for outbound communication and establishing an outbound communication session in response to the determination that an outbound communication is pending.

The disclosed subject matter also relates to a machine-readable medium comprising instructions stored therein, which when executed by a machine, cause the machine to perform operations including configuring a communication channel, selectively configurable between receiving a new inbound communication session and initiating a new outbound communication session, for receiving a new inbound communication session, processing an inbound communication session, determining the inbound communication session has terminated, determining that an outbound communication is pending in response to termination of the inbound communication session, and reconfiguring the communication channel for outbound communication and establishing an outbound communication session in response to the determination that an outbound communication is pending.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
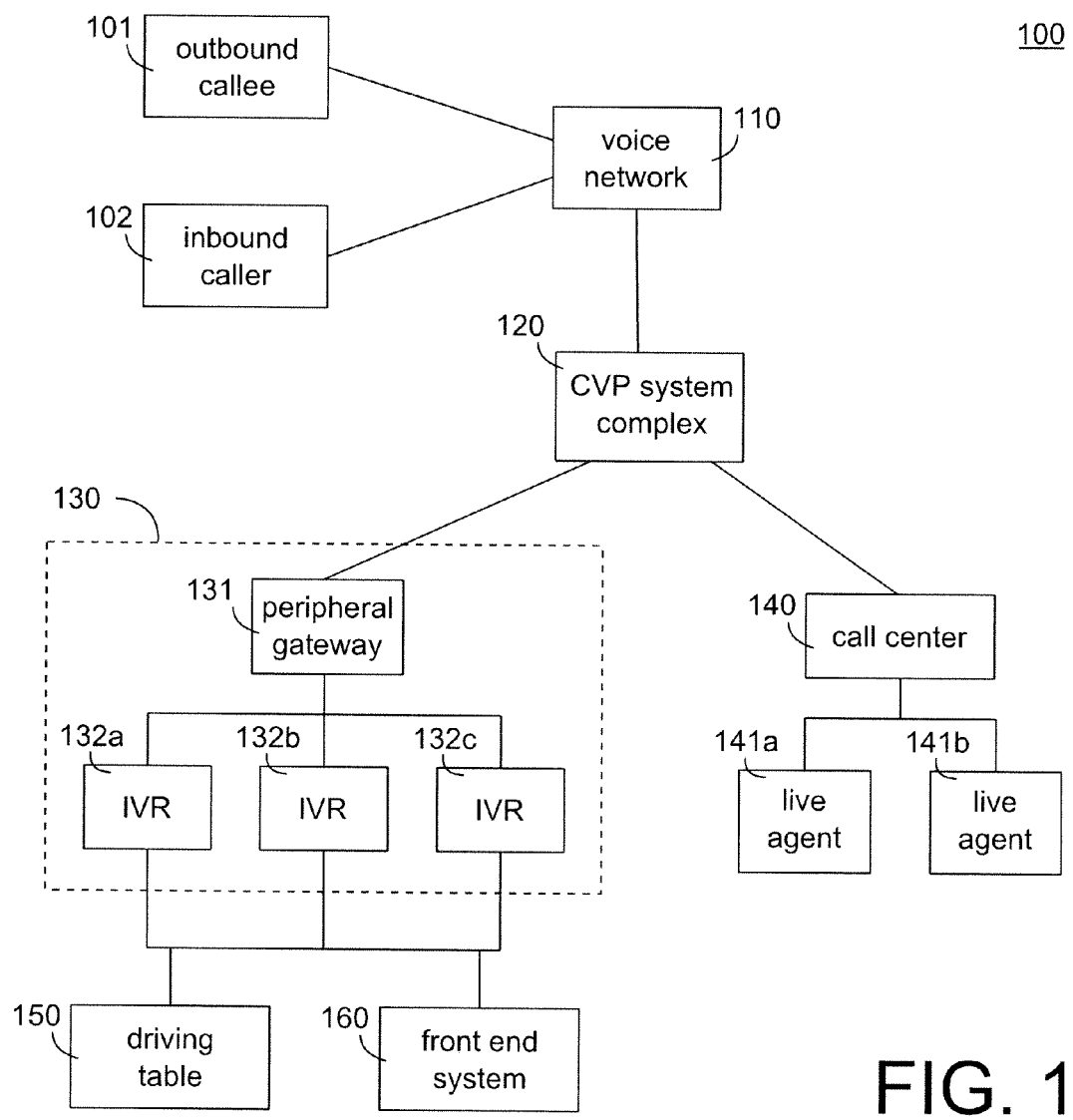
FIG. 1 illustrates an exemplary architecture diagram for the disclosed techniques.

FIG. 1 illustrates an exemplary architecture diagram for the disclosed techniques. Voice network 110 provides voice communication services between parties, such as between inbound caller 102 and outbound callee 101, or between call center 140 and outbound callee 101. Examples of voice network 110 include a landline connection through a public switched telephone network (PSTN). A communication session may also be initiated via a voice over Internet Protocol (VoIP) call or connection, or establishing a voice call or hybrid voice/data call via other wired or wireless channels. Ordinarily there will be many more communicants on voice network 110 than illustrated in FIG. 1.

IVR farm 130 and call center 140 each establish inbound and outbound communication sessions with voice network 110 via CVP system complex 120. An inbound communication session occurs where a communicant on voice network 110, such as inbound caller 102, initiates, via voice network 110, an exchange of communications with one of the IVR systems, such as IVR system 132a. An outbound communication session occurs where one of the IVR systems, such as IVR system 132a, initiates, via voice network 110, an exchange of communications with a communicant on voice network 110, such as outbound callee 101, via voice network 110. Additionally, although a party may initiate a communication session (either inbound or outbound), the communication session might not be established if the other party does not accept the communication session. CVP system complex 120 is associated with one or more addresses on voice network 110. For example, where voice network 110 is a PSTN network, CVP system complex 120 has one or more associated telephone numbers that an inbound caller 102 may use to establish an inbound communication session with CVP system complex 120, and ultimately one or more of the elements behind CVP system complex 120. For an inbound communication session, such as a telephone call initiated by inbound caller 102, CVP system complex 120 routes an inbound communication session to one of IVR farm 130 and call center 140. In some embodiments, there may be multiple IVR farms, and the decision to route an inbound call to a particular IVR farm may be based upon respective geographic locations of inbound caller 102 and the IVR farms, as indicated by respective communication addresses, or the number of communication sessions being handled by each IVR farm. In some embodiments, a number of communication channels, ports, or lines are allocated between CVP system complex 120 and voice network 110, and these channels, ports, or lines may be switched between handling inbound communication sessions (i.e., sessions initiated by communicants on voice network 110) and outbound communication sessions (i.e., sessions initiated by a system "behind" CVP system complex 120, such as IVR farm 130 and call center 140. Additionally, where a communication session has been established, such as an outbound communication session between IVR farm 130 and outbound callee 101, CVP system complex 120 is operable to transfer a communication session from one communicant behind CVP system complex 120 to another communicant. For example, once IVR farm 130 has determined outbound callee 101 is a "live" communicant, CVP system complex 120 may reroute the original communication session between IVR farm 130 and outbound callee 101 to be between call center 140 and outbound callee 101, without terminating the communication session.

IVR farm 130 includes peripheral gateway 131 and IVR servers 132a, 132b, and 132c. In some embodiments, IVR servers 132a, 132b, and 132c may be physically collocated. Some embodiments may include more or less IVR servers than illustrated in FIG. 1. In some embodiments, a peripheral gateway may be used for multiple IVR farms; for example, where CVP system complex 120 determines which of the IVR servers to route a new inbound communication session. When an inbound communication session is received by IVR farm 130, peripheral gateway 131 routes the communication session to one of IVR servers 132a, 132b, and 132c. In some embodiments, a determination of which of the IVR servers peripheral gateway 131 will route a new inbound communication session is based on a number of inbound communication ports available on each IVR server, and/or a number of active inbound communication sessions currently being handled by each IVR server. Peripheral gateway 131 and CVP system complex 120 are responsive to commands received from one another or IVR servers 132a, 132b, and 132c. For example, IVR server 132a may issue a command to CVP system complex 120 to configure a communication port to be assigned for outbound communication. When IVR server 132a determines it should attempt an outbound communication session, it cycles the line, which indicates to peripheral gateway 131 managing the line that the line is no longer in the same state and should not be able to take an inbound call. Shortly thereafter, if conditions are still right to permit a dial out, a message is sent by IVR 132a to peripheral gateway 131 which indicates that the line is busy with a call and cannot handle a new inbound communication session. In some embodiments the functionality of peripheral gateway 131 may be integrated into CVP system complex 120. In some embodiments with multiple IVR farms, rather than a single CVP system complex 120, the functionality of CVP system complex 120 may be integrated into peripheral gateway 131 associated with IVR farm 130.

IVR server 132a includes a communication interface which allows for establishing multiple inbound and outbound communication sessions with voice network 110. In some embodiments, Voice Over IP (VOIP) is used to connect an IVR server 132a to a PSTN telephone network through a VOIP-to-PSTN gateway system. In some embodiments, IVR server 132a has a predetermined number of virtual ports (not illustrated) for communication, each capable of conducting a single inbound or outbound communication session. In some embodiments, one or more ports may be dedicated for inbound communication sessions or dedicated for outbound communication sessions. In some embodiments, ports may be selectively configurable such that the ports are able to be used for either inbound or outbound communication sessions as desired. In some embodiments, some ports may be dedicated for inbound and/or outbound communication sessions while other ports may be selectively used for either inbound or outbound communication sessions. In some embodiments, the ports may be divided between a set dedicated for inbound communication sessions, a set which each can be selectively used for either inbound or outbound communication sessions, and a set dedicated for second line referral.

Figure 2:
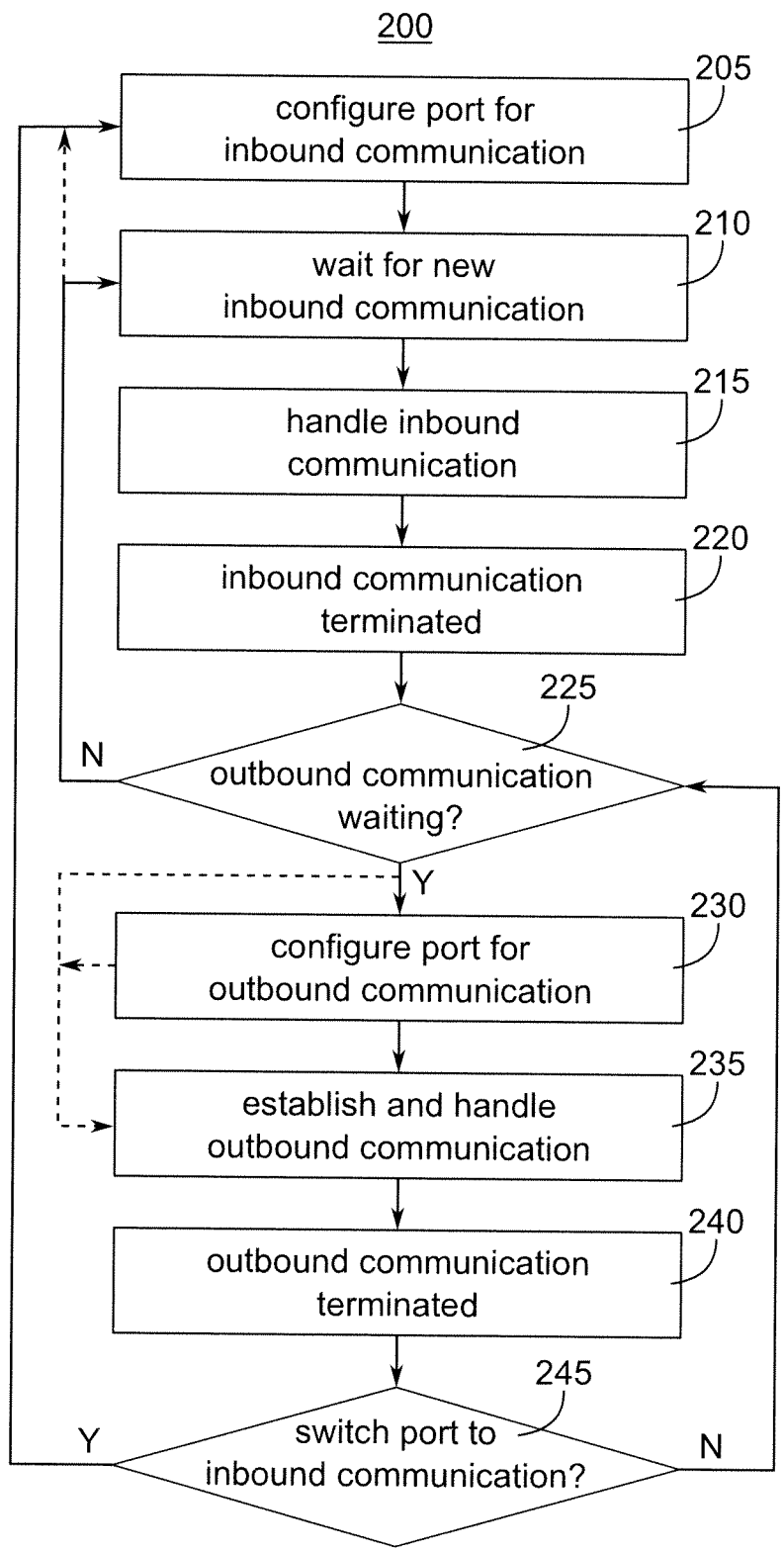
FIG. 2 illustrates a process 200 by which a virtual port included in IVR server 132*a* is controlled.

For each port, IVR server 132a is able to generate voice output for receipt by a communicant, and is also responsive to input, such as voice commands or Dual Tone Multi Frequency (DTMF) commands, received from a communicant. Under the control of software executing on IVR 132a, for example, this mechanism for outputting information and receiving input is used to interact with a communicant. As an example, IVR server 132a may be configured to process incoming communication sessions by providing a voice-operated menu, navigable by use of simple voice commands or DTMF input, for inbound caller 102 to submit and obtain information, such as account balance information. IVR server 132a prompts the caller for certain information, collects other information (e.g., dialed number, caller ANI) obtained from voice network 110. Based on the collected and other information and services available to IVR server 132a, a customer may be able to perform automated self service activities solely by interacting with the IVR system. In other situations a customer may need to speak with a live agent in order to proceed. Also, as illustrated in FIG. 2 of the present disclosure, IVR 132a may be configured to initiate outbound communication sessions with communicants such as outbound callee 101. The above mechanism for outputting information and receiving input is also useful for interacting with outbound callee 101. Additionally, IVR server 132a is responsive to, and/or can determine, communication session status information, such as when a communicant has terminated a communication session, as illustrated in part by steps shown in FIG. 2 of the present disclosure.

Driving table 150 is provided by, for example, a database system that maintains driving table records for use by the IVR servers 132a, 132b, 132c. To establish outbound communication sessions, the IVR servers 132a, 132b, 132c obtain driving table records from driving table 150, providing information, such as telephone numbers, used to initiate and establish outbound communication sessions. Driving table records may contain additional information about their respective communicants, such as account information, or information relating to previous communications or attempts to communicate with the communicant. Further, individual driving table records may be associated with various outbound projects involving outbound communications initiated by IVR servers 132a, 132b, 132c, and the driving table records may be grouped within those outbound projects. An example of an outbound project is an after-call survey campaign, in which a subset of customers that have concluded customer support calls are contacted in order to perform a customer satisfaction survey. An outbound project may be entirely automated, in which only an IVR server interacts with a communicant, or live agents may be used, as discussed below. FIG. 1 illustrates an embodiment in which IVR servers 132a to 132c are connected via a network to driving table 150. In some embodiments with multiple IVR farms, each IVR farm may have a separate driving table.

Front end system 160 provides a user interface for managing the operation of driving table 150 and IVR farm 130. For example, front end system 160 may be used to add, modify, or delete driving table records in driving table 150. Additionally, front end system 160 may be used to assign driving table records to various outbound projects and groups of driving table records for outbound projects. Also, front end system 160 may be used to control which IVR servers and outbound projects are active, what times they are active, and how virtual ports on each of the IVR servers 132a, 132b, 132c are to be used (e.g., solely for inbound communication, for mixed inbound/outbound communication, or solely for outbound communication). In some embodiments, such control may be effected, at least in part, by use of the cron job scheduling software and the rsh (remote shell) software, or the like, for performing scheduled remote control of the IVR servers. In some embodiments, each of the IVR servers may also be utilizing the cron software, with a crontab file remotely administered by front end system 160, in order to selectively enable and disable various outbound projects and OBTWIs, possibly on a per-IVR server basis.

Call center 140 coordinates the activities of a plurality of live agents, such as live agents 141a and 141b illustrated in FIG. 1. CVP system complex 120 may be configured, in some circumstances, to directly connect an inbound caller 102 to call center 140, or even a particular live agent 141a or 141b within the call center 140. In other circumstances, an IVR server, such as IVR server 132a, is used to establish a communication session with an inbound or outbound caller, and once having established the communication, transfers the communication to call center 140 for handling by live agent 141a. In some embodiments, one of a plurality of virtual ports, configured for "second line referral" mode, may be needed to perform the transfer, and may be unavailable until the communication session is terminated or returns to the IVR server (e.g., the call center transfers the call back). In some embodiments, multiple call centers may be provided. In some embodiments, cell centers are staffed to have particular outbound projects (e.g., one call center has live agents trained for project_1, whereas a different call center has call agents trained for project_2). For example, it may be easier to staff live agents during all of the desired hours of operation by utilizing call centers located in various time zones. In some embodiments, live agents 141a and 141b may be physically collocated. In some embodiments, live agents 141a and 141b may each be operating for different locations, such as their homes, with call center 140 coordinating their activities.

FIG. 2 illustrates a process 200 by which a virtual port included in IVR server 132a is controlled. Although FIG. 2 illustrates a process for controlling a single virtual port, in IVR server 132a process 200 may be applied to one or more of the plurality of virtual ports included in IVR server 132a.

At step 205, the virtual port is configured for inbound communication. Configuration of IVR server 132a, gateway 131, and CVP system complex 120 may be performed such that a new inbound communication may be established from inbound caller 102 to the virtual port.

At step 210, process 200 waits for a new inbound communication to be received on the virtual port. In some embodiments, step 210 may wait indefinitely for the new inbound communication. In some embodiments, step 210 may wait a predetermined period of time for a new inbound communication to arrive at the virtual port. In some embodiments, the waiting performed at step 210 may be interrupted. In instances where step 210 is interrupted or the predetermined period of time expires before a new inbound communication is established, process 200 may advance to step 225 (this transition, whereby steps 215 and 220 are skipped, is not illustrated in FIG. 2) and/or conduct further assessments or actions. For example, process 200 may seek to avoid a situation in which there are too few inbound communication sessions relative to desired outbound communication sessions, but the lack of inbound communication sessions does not allow for sufficient "triggering" of outbound communications.

At step 215, IVR server 132a handles an established inbound communication session. For example, IVR server 132a may provide a voice-operated menu, navigable by use of simple voice commands or DTMF input, for inbound caller 102 to submit and obtain information. In some embodiments or circumstances, IVR server 132a may transfer handling of the inbound communication session to call center 140 for involvement of live agent 141a.

At step 220, the inbound communication session is terminated, either by IVR server 132a, or IVR server 132a detects that the session has been terminated. IVR server 132a may perform some cleanup operations at this point, such as resetting the virtual port.

At step 225, IVR server 132a determines if there is an outbound communication waiting to be established. In some embodiments, IVR server 132a obtains information from driving table 150 regarding pending outgoing communications, and obtains a driving table record including a communication address for establishing an outgoing communication session. If no outbound communication is waiting for processing, then process 200 returns to step 210 to wait for and process the next incoming communication session. In a situation in which step 245 was performed immediately prior to step 225 (i.e., the virtual port was most recently configured for outbound communication), process 200 instead returns to step 205 in order to reconfigure the virtual port for inbound communication (as illustrated by the dashed line leading to step 205 in FIG. 2). If at step 225 it is determined that an outbound communication is waiting, then process 200 advances to step 230, such that the inbound communication session of step 215 will be immediately followed by a new outbound communication session.

At step 230, the virtual port is reconfigured for outbound communication. Configuration of IVR server 132a, gateway 131, and CVP system complex 120 may be performed to ensure the necessary resources are in place for establishing a new outbound communication session from the virtual port to outbound callee 101. In some embodiments, if the previous communication session was an outgoing communication session (i.e., step 245 immediately preceded step 225), some or all of the configuration of step 230 may be avoided (as illustrated by the dashed lines leading to step 235 in FIG. 2), as various settings for the virtual port are already configured for outgoing communication.

At step 235, IVR 132a establishes and handles an outbound communication session. In some embodiments, a communication address used to establish the session is included in a driving table record obtained from driving table 150. To handle the new outbound communication session, for example, IVR server 132a may execute program code to provide a voice-operated menu, navigable by use of simple voice commands or DTMF input, by which outbound caller 102 can submit and obtain information. In some embodiments or circumstances where it is determined that live interaction with outbound caller 102 is needed, IVR server 132a may transfer handling of the outbound communication session to call center 140 for involvement of live agent 141a.

At step 240, the outbound communication session is terminated, either by IVR server 132a, or IVR server 132a detects that the session has been terminated. IVR server 132a may perform some cleanup operations at this point, such as resetting the virtual port.

At step 245, IVR server 132a determines whether there is a particular need to switch the virtual port back to processing inbound communication. For example, in some embodiments it may be desired to ensure a minimum number of virtual ports are immediately available to handle incoming communication sessions from customers. Typically, inbound communication sessions are prioritized over outbound communication sessions in order to meet customer service expectations (e.g., by ensuring that when a customer calls, IVR server 132a is prepared to promptly handle the incoming call). If this determination is positive, process 200 returns to step 205 to reconfigure the virtual port for use for inbound communications. If the determination is negative, process 200 instead returns to step 225 to determine if there is another outbound communication waiting. In this manner, successive outbound communication sessions, without an intervening inbound communication session, may be conducted via the virtual port.

At any time, there may be a plurality of virtual ports for IVR server 132a that are waiting for a new inbound communication session. In some embodiments, to better ensure balanced loading of the virtual ports, multi-line hunting techniques such as circular hunting or most idle hunting may be used to select the next virtual port used to handle an incoming communication session.

As shown by the above discussion, functions relating to the IVR-related techniques may be implemented on computers connected for data communication via the components of a packet data network. Although special purpose devices may be used, such devices also may be implemented using one or more hardware platforms intended to represent a general class of data processing device commonly used to run "server" programming so as to implement the IVR-related techniques discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the IVR-related techniques. The software code is executable by the general-purpose computer that performs the IVR-related techniques. In operation, the code is stored within the general-purpose computer platform. At other times, however, the software may be stored at other locations and/or transported for loading into the appropriate general-purpose computer system. Execution of such code by a processor of the computer platform enables the platform to implement the IVR-related techniques, in essentially the manner performed in the implementations discussed and illustrated herein.

Figure 3:
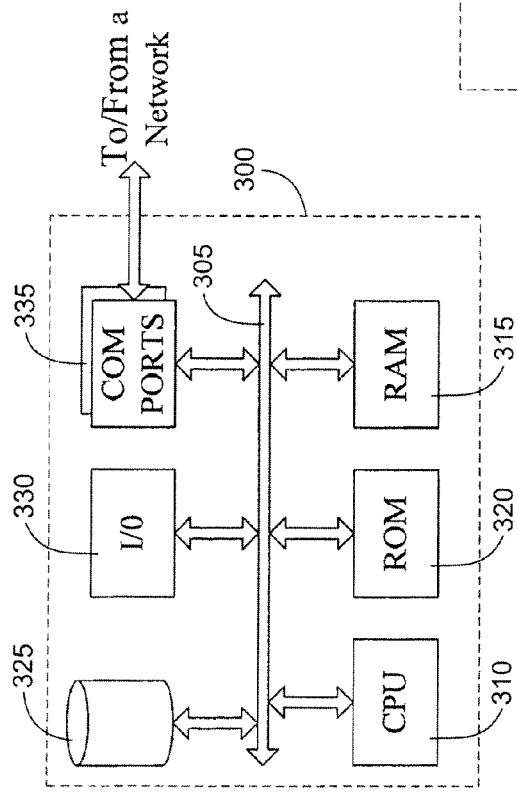
FIG. 3 illustrates a functional block diagram of a general purpose computer platform 300.
Figure 4:
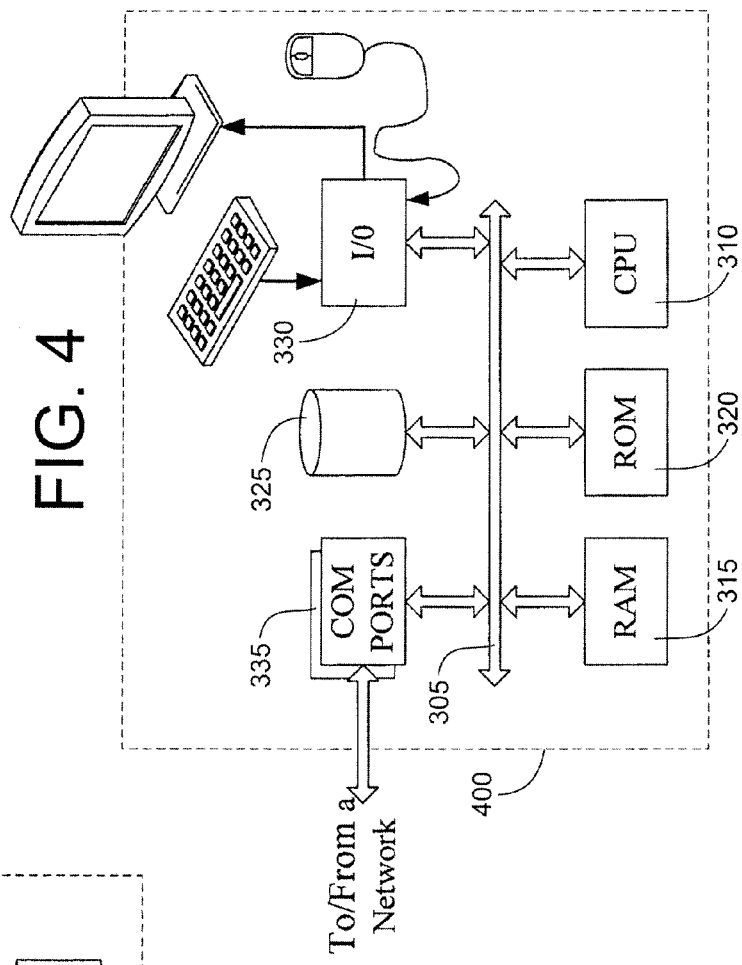
FIG. 4 illustrates a functional block diagram of a general purpose computer platform 400.

FIGS. 3 and 4 provide functional block diagram illustrations of general purpose computer hardware platforms. FIG. 3 illustrates a network or host computer platform 300, as may typically be used to implement a server. FIG. 4 depicts a computer 400 with user interface elements, as may be used to implement a personal computer or other type of work station or terminal device, although computer 300 may also act as a server if appropriately programmed. It is believed that those skilled in the art are familiar with the structure, programming and general operation of such computer equipment and as a result the drawings should be self-explanatory.

Computers 300 and 400 each include a bus 305, processing unit(s) 310, a system memory (RAM) 315, a read-only memory (ROM) 320, a permanent storage device 325, an input/output (I/O) device interface 330, and a communication interface 335.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the invention use a mass-storage device (such as a magnetic or optical disk and its corresponding disk drive) as the permanent storage device 325.

Other implementations use a removable storage device (such as a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the invention's processes are stored in the system memory 315, the permanent storage device 325, and/or the read-only memory 320. For example, the various memory units include instructions for processing multimedia items in accordance with some implementations. From these various memory units, the processing unit(s) 310 retrieves instructions to execute and data to process in order to execute the processes of some implementations.

The bus 305 also connects to the I/O device interfaces 330. The I/O device interface 330 enables the user to communicate information and select commands to the electronic system. Input devices used with I/O device interface 330 include, for example, alphanumeric keyboards and pointing devices (also called "cursor control devices"). I/O device interface 330 also enables, for example, the display of images generated by the electronic system 300. Output devices used with I/O device interface 330 include, for example, printers and display devices, such as cathode ray tubes (CRT) or liquid crystal displays (LCD). Some implementations include devices such as a touchscreen that functions as both input and output devices.

Finally, as shown in FIG. 3, bus 305 also couples electronic system 300 to a network (not shown) through a communication interface 335. In this manner, the computer can be a part of a network of computers (such as a local area network ("LAN"), a wide area network ("WAN"), or an Intranet, or a network of networks, such as the Internet. Any or all components of electronic system 300 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the IVR-related techniques outlined in this disclosure may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the IVR-related techniques discussed in this disclosure. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for automated communication comprising:

configuring a first communication channel for receiving a new inbound communication session, the first communication channel being selectively configurable between receiving a new inbound communication session and initiating a new outbound communication session;

processing a first inbound communication session using the first communication channel;

determining that the first inbound communication session has terminated;

determining that an outbound communication is pending, the determination made in response to the determination that the first inbound communication session has terminated;

in response to the determination that an outbound communication is pending, reconfiguring the first communication channel for initiating a new outbound communication session and establishing a first outbound communication session using the first communication channel;

determining that the first outbound communication session has terminated;

determining, in response to the determination that the first outbound communication session has terminated, whether additional communication channels are requested for inbound communication;

in response to determining that additional communication channels are requested for the further inbound communication, reconfiguring the first communication channel for receiving a new inbound communication session and establishing a second inbound communication session using the first communication channel; and in response to determining that additional communication channels are not requested for inbound communication, establishing a second outbound communication session using the first communication channel.

2. The method of claim 1, wherein
the first communication channel is one of a plurality of virtual ports included in an interactive voice response system for establishing communication via a telephone network.

3. The machine-implemented method of claim 2, further comprising:
ensuring a minimum number of virtual ports of the plurality of virtual ports of the interactive voice response system are immediately available to handle inbound communication sessions.

4. The method of claim 1, wherein
the first communication channel is included in a first plurality of communication channels, the first plurality of communication channels being arranged in a predetermined order; and the method further comprises:
configuring each of a second plurality of communication channels, included in the first plurality of communication channels, for receiving a new inbound communication session;
receiving a request to establish a second inbound communication session;
establishing the second inbound communication session using the one of the second plurality of communication channels most immediately subsequent to the first communication channel in the predetermined order.

5. The method of claim 1, wherein
the first communication channel is included in a first plurality of communication channels; and the method further comprises:
configuring each of a second plurality of communication channels, included in the first plurality of communication channels, for receiving a new inbound communication session;
receiving a request to establish a second inbound communication session;
establishing the second inbound communication session using the one of the second plurality of communication channels that was least recently used for a communication session.

6. The machine-implemented method of claim 1, wherein the first outbound communication and the second outbound communication are based on respective communicant information obtained from a driving table.

7. The machine-implemented method of claim 1, further comprising:
transferring handling of the second outbound communication to a call center for involvement of a live agent.

8. A system for automated communication, the system comprising:
one or more processors; and
a machine-readable medium comprising instructions stored therein, which when executed by the processors, cause the processors to perform operations comprising:
configuring a first communication channel for receiving a new inbound communication session, the first communication channel being selectively configurable between receiving a new inbound communication session and initiating a new outbound communication session;
processing a first inbound communication session using the first communication channel;
determining that the first inbound communication session has terminated;
determining that an outbound communication is pending, the determination made in response to the determination that the first inbound communication session has terminated; and
in response to the determination that an outbound communication is pending, reconfiguring the first communication channel for initiating a new outbound communication session and establishing a first outbound communication session using the first communication channel;
determining that the first outbound communication session has terminated;
determining, in response to the determination that the first outbound communication session has terminated, whether additional communication channels are requested for inbound communication;
in response to determining that additional communication channels are requested for inbound communication, reconfiguring the first communication channel for receiving a new inbound communication session and establishing a second inbound communication session using the first communication channel; and
in response to determining that additional communication channels are not requested for inbound communication, establishing a second outbound communication session using the first communication channel.

9. The system of claim 8, wherein
the first communication channel is one of a plurality of virtual ports included in an interactive voice response system for establishing communication via a telephone network.

10. The system of claim 9, wherein further instructions cause the one or more processors to perform operations further comprising:
ensuring a minimum number of virtual ports of the plurality of virtual ports of the interactive voice response system are immediately available to handle inbound communication sessions.

11. The system of claim 8, wherein
the first communication channel is included in a first plurality of communication channels, the first plurality of communication channels being arranged in a predetermined order; and the instructions cause the processors to perform operations further comprising:
configuring each of a second plurality of communication channels, included in the first plurality of communication channels, for receiving a new inbound communication session;
receiving a request to establish a second inbound communication session;
establishing the second inbound communication session using the one of the second plurality of communication channels most immediately subsequent to the first communication channel in the predetermined order.

12. The system of claim 8, wherein
the first communication channel is included in a first plurality of communication channels; and the instructions cause the processors to perform operations further comprising:
configuring each of a second plurality of communication channels, included in the first plurality of communication channels, for receiving a new inbound communication session;
receiving a request to establish a second inbound communication session;
establishing the second inbound communication session using the one of the second plurality of communication channels that was least recently used for a communication session.

13. The system of claim 8, wherein the first outbound communication and the second outbound communication are based on respective communicant information obtained from a driving table.

14. The system of claim 8, wherein further instructions cause the one or more processors to perform operations further comprising:
transferring handling of the second outbound communication to a call center for involvement of a live agent.

15. A non-transitory machine-readable medium comprising instructions stored therein, which when executed by a machine, cause the machine to perform operations comprising:
configuring a first communication channel for receiving a new inbound communication session, the first communication channel being selectively configurable between receiving a new inbound communication session and initiating a new outbound communication session;
processing a first inbound communication session using the first communication channel;
determining that the first inbound communication session has terminated;
determining that an outbound communication is pending, the determination made in response to the determination that the first inbound communication session has terminated; and
in response to the determination that an outbound communication is pending, reconfiguring the first communication channel for initiating a new outbound communication session and establishing a first outbound communication session using the first communication channel;
determining that the first outbound communication session has terminated;
determining, in response to the determination that the first outbound communication session has terminated, whether additional communication channels are requested for inbound communication;
in response to determining that additional communication channels are requested for inbound communication, reconfiguring the first communication channel for receiving a new inbound communication session and establishing a second inbound communication session using the first communication channel; and
in response to determining that additional communication channels are not requested for inbound communication, establishing a second outbound communication session using the first communication channel.

16. The non-transitory machine-readable medium of claim 15, wherein
the first communication channel is one of a plurality of virtual ports included in an interactive voice response system for establishing communication via a telephone network.

17. The non-transitory machine-readable medium of claim 16, wherein further instructions cause the machine to perform operations further comprising:
transferring handling of the second outbound communication to a call center for involvement of a live agent.

18. The non-transitory machine-readable medium of claim 15, wherein
the first communication channel is included in a first plurality of communication channels, the first plurality of communication channels being arranged in a predetermined order; and the instructions cause the machine to perform operations further comprising:
configuring each of a second plurality of communication channels, included in the first plurality of communication channels, for receiving a new inbound communication session;
receiving a request to establish a second inbound communication session;
establishing the second inbound communication session using the one of the second plurality of communication channels most immediately subsequent to the first communication channel in the predetermined order.

19. The non-transitory machine-readable medium of claim 15, wherein
the first communication channel is included in a first plurality of communication channels; and the instructions cause the machine to perform operations further comprising:
configuring each of a second plurality of communication channels, included in the first plurality of communication channels, for receiving a new inbound communication session;
receiving a request to establish a second inbound communication session;
establishing the second inbound communication session using the one of the second plurality of communication channels that was least recently used for a communication session.

20. The non-transitory machine-readable medium of claim 15, wherein further instructions cause the machine to perform operations further comprising:
ensuring a minimum number of virtual ports of the plurality of virtual ports of the interactive voice response system are immediately available to handle inbound communication sessions.

* * * * *